United States Patent [19]

Gates

[11] Patent Number: 4,480,466

[45] Date of Patent: Nov. 6, 1984

[54] APPARATUS AND METHOD FOR DETERMINING LIQUID FLOWRATE

[76] Inventor: Wendall C. Gates, Box 2070, Santa Cruz, Calif. 95063

[21] Appl. No.: 496,548

[22] Filed: May 20, 1983

[51] Int. Cl.³ .............................................. G01F 1/20
[52] U.S. Cl. ......................................... 73/195; 73/215
[58] Field of Search ................. 73/195, 196, 215, 227; 364/510

[56] References Cited

U.S. PATENT DOCUMENTS 3,996,798 12/1976 Vander Heyden ................... 73/195

4,397,191 8/1983 Forden ................................. 73/195

*Primary Examiner*—Herbert Goldstein
*Attorney, Agent, or Firm*—Owen, Wickersham & Erickson

[57] ABSTRACT

An open-channel liquid flowmeter which is not disabled by submergence of the primary device measures flowrate using both critical-flow and velocity-area techniques and compares results to determine the conditions of flow. The device then selects the method offering the greatest probability of accuracy at that moment and computes flow using the selected method.

9 Claims, 3 Drawing Figures

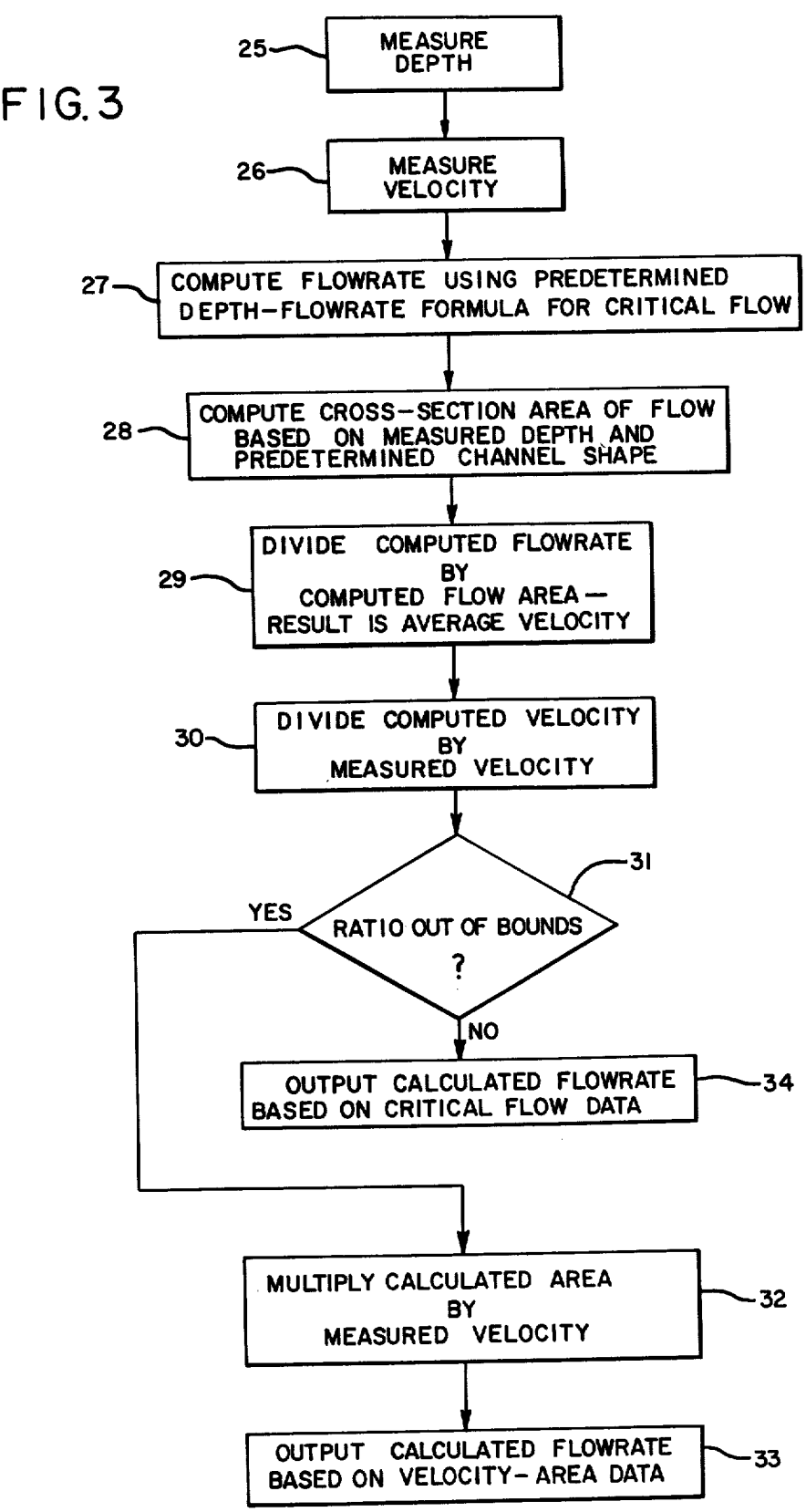

APPARATUS AND METHOD FOR DETERMINING LIQUID FLOWRATE

BACKGROUND OF THE INVENTION

The invention relates to liquid flowrate monitoring, and more particularly to an improved monitoring system which chooses one of a plurality of flowrate determination methods, depending upon which is more accurate for conditions prevailing at the time a determination is to be made.

Increasing activity in water pollution control and a growing scarcity of irrigation water have created a need for open-channel flow monitoring instruments with improved accuracy and reliability. Previously available instrumentation has employed either critical-flow or velocity-area techniques. Flowmeters using critical-flow techniques have delivered 95% to 98% accuracy when properly installed, but have been rendered useless by submergence. Velocity-area type flowmeters have been able to operate in both submerged and free-flowing conditions, but with much larger errors, by factors of up to 10 compared with critical-flow meters, due primarily to velocity profile related factors.

In a large number (probably the majority) of applications, the condition of submergence is occasional, with critical flow conditions occurring most of the time. A critical-flow instrument determines flowrate from a measurement of liquid depth, so the submergence is read and integrated as a very large flowrate, even if the liquid is not moving and the flowrate is actually zero. The velocity-area meter can measure the flow under submerged conditions, but displays very poor measuring accuracy because of the difficulty in measuring the small velocities inherent in the low flowrates, and also due to errors resulting from uncertainties and variation in the velocity profile.

SUMMARY OF THE INVENTION

Broadly speaking, the flowmeter of this invention measures flowrate using both critical-flow and velocity-area techniques, and determines which data to use. A primary device, such as Palmer-Bowlus flume, is fitted with devices to measure automatically, at selected time intervals, both liquid depth and liquid velocity. From a measurement of liquid depth, the cross-sectional area of the flow and, using well-known principles of hydraulics, the flowrate for critical flow conditions may be calculated. Mathematically dividing calculated flowrate by the cross-sectional area yields average velocity of flow. This value is adjusted for profile effects and compared to the measured velocity.

If the measured and calculated velocities differ by more than a preset tolerance, the meter system of the invention infers that critical flow conditions do not exist and computes flowrate using the measured velocity and area. If, on the other hand, calculated and measured velocities agree, then the meter computes flow using the more accurate critical-flow method.

The result is best described by example. If, in a particular installation, critical-flow method accuracy is 97% and velocity-area method accuracy is 90%, and the installation runs submerged 1 hour per day, 23 hours at 97% and 1 hour at 90% result in an overall accuracy of approximately 96.7%. This is a substantial improvement over the 90% accuracy of the velocity-area meter alone, for the conditions of this example.

While this method may be implemented with any combination of depth and velocity measuring techniques, it is desirable to maximize the accuracy of the measurement and so the device as described herein is implemented with ultrasonic measurement techniques.

DESCRIPTION OF THE DRAWINGS

FIG. 3 is an illustration of an algorithm for implementing one embodiment of this invention.

DESCRIPTION OF PREFERRED EMBODIMENTS

Figure 1:
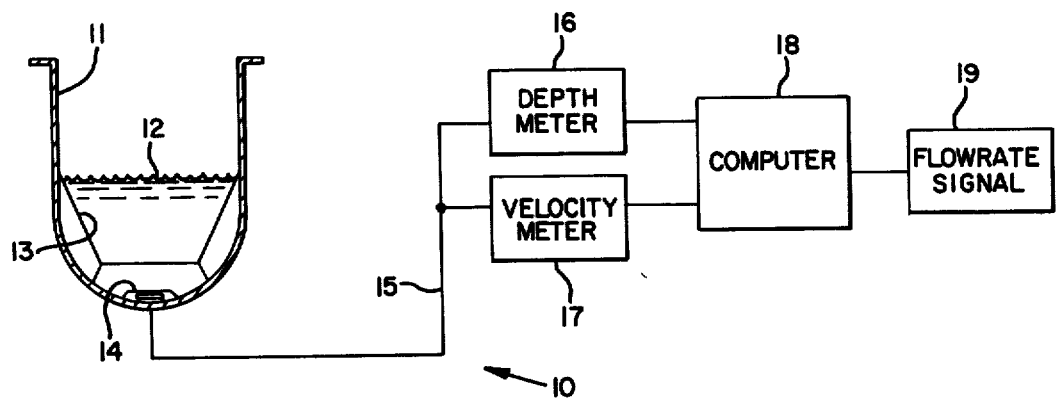
FIG. 1 is an illustration in block diagrammatic form of one embodiment of a flowmeter constructed in accordance with the principles of this invention.

Referring to FIG. 1, there is illustrated one embodiment of the basic elements of a flowmeter 10 of this invention. A channel 11 of known size and shape is constructed to include a constriction 13, which imposes under normal circumstances a condition of critical flow in a flowing liquid 12 in the channel (typically water). In or near the bottom of the channel 11 is affixed a sensor assembly 14, which is connected via a cable 15 to a liquid depth meter 16 and a liquid velocity meter 17. These meters are connected to or incorporated in a computer means 8, which sends a flowrate signal 19 to a suitable form of receiving means (not shown).

Figure 2:
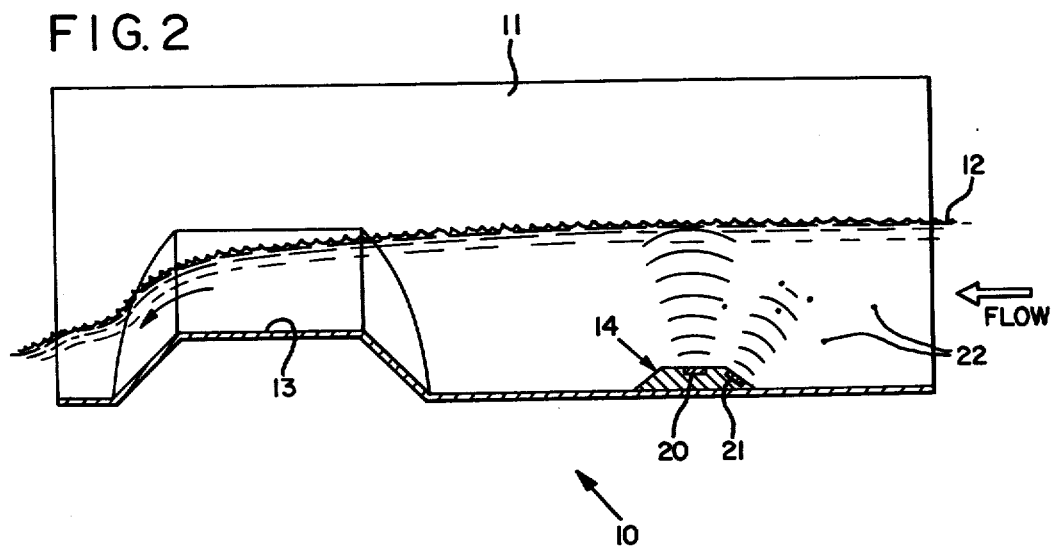
FIG. 2 is an illustration in sectional view of a channel with depth and velocity sensors in accordance with one embodiment of this invention.

In FIG. 2, the channel 11 is shown with the sensor assembly 14 affixed to the channel bottom upstream of the constriction 13. The sensor assembly 14 contains a depth sensor 20 and a velocity sensor 21.

As represented in the illustrated embodiment, the depth sensor 20 preferably comprises a piezoelectric crystal which emits pulses of ultrasonic energy in response to a voltage signal carried from the depth meter 16 through the cable 15. The ultrasonic energy travels upward to the liquid surface 12, from which most of the energy is reflected downward. The returning ultrasonic energy generates an electrical voltage in the depth sensor piezoelectric crystal 20. This signal is transmitted by the cable 15 back to the depth meter 16.

The depth meter 16 measures the time of echo travel and produces an electrical signal corresponding to liquid depth; this signal may be analog or digital in form. Instrumentation to perform this function is commercially available, and its function is not a part of this invention.

The liquid velocity meter 17 is illustrated as a Doppler-shift meter. The velocity sensor 21 emits a directional continuous ultrasonic signal into the liquid 12. Particles or air bubbles 22 suspended in the liquid reflect some of the signal back to sensor 11. This signal is shifted in frequency due to the motion of the particles, and is transmitted by the cable 15 to the velocity meter 17. The velocity meter 17 measures the shift in frequency and produces an electrical signal proportional to liquid velocity; this signal may be analog or digital. Instrumentation to perform this function is also commercially available, and its function is not a part of this invention. Where the flowing liquid does not contain particles or bubbles, a transit-time version of the ultrasonic velocity measurement may be substituted, as is also well known and commercially available.

FIG. 3 is a flow chart of an algorithm by which the preferred-data selection function of this invention may be implemented on a computer. First, the computer acquires liquid depth and velocity data from the depth and velocity meters, indicated in blocks 25 and 26. This may be done on a substantially continuous basis or at appropriate intervals, depending on the specific application. In irrigation monitoring, once per 5 minutes may be adequate. For river stage monitoring, once per half hour may be enough, because the water level changes more slowly. With battery operated equipment, the operational life of the battery may be extended by extending the interval between measurements. In some cases, only changes in depth or velocity may be signalled, triggering calculations as described below.

Having acquired the depth and velocity data, the computer next calculates the flowrate using measured depth and assuming critical flow conditions (block 27) for the particular shape of the channel 11, using relationships derived from hydraulics science for the primary device as used in a specific application, and which are not a part of this invention. The computer than calculates the cross-sectional area of the flow at the sensor, using the measured depth and the predetermined geometry of the channel, as indicated in block 28. This is an inherently accurate determination of flow area, since the geometry of the channel is known and the depth measurement is accurate.

The computer than divides the calculated flowrate by the calculated flow area (block 29) to obtain the average flow velocity for critical-flow conditions, and further modifies this velocity based on the anticipated velocity profile for the specific channel configuration.

At this time, the computer quantitatively compares the calculated velocity to the measured velocity, as indicated in block 30, preferably producing a ratio, although a difference could be used. If these two velocities differ in excess of the predetermined criteria for the existing conditions at the specific installation, i.e. if their ratio is not within prescribed limits for the installation, as indicated in decision block 31, then the computer calculates a flowrate by multiplying the calculated cross-section area by the measured velocity (block 32), and outputs this result (block 33). If the calculated and measured velocities adequately agree, then the previously calculated critical-flow flowrate is retained. The computer then adjusts its output to correspond with the value of the flowrate it has selected (block 34).

Various embodiments of this invention may be implemented with various types of sensors. Liquid depth may be measured by pressure transducer, overhead ultrasonic transducer, float or other means. Velocity may be measured by transit-time ultrasonics, turbine, target or other means. The depth and velocity meters may be separate or may be incorporated into the computer means. The sensors may be mounted directly in the liquid, as described in the foregoing example, or may be mounted externally to the conduit, as in the case of clamp-on ultrasonic transducers.

This invention is also applicable to flows in closed conduits, where flow occurs continually or occasionally in the partly-full condition.

Having described a preferred embodiment of the invention, various other embodiments, modifications and improvements will be apparent to those skilled in the art, and the invention should be construed as limited only by the spirit and scope of the appended claims.

I claim:

1. A flowmeter for measuring the flow of liquid in a channel or other conduit of known channel geometry, comprising:

liquid depth measurement means;

liquid velocity measurement means;

computer means for calculating a flowrate based on depth measurement, for calculating a velocity based on said flowrate and channel geometry, for making a comparison of said calculated velocity with velocity measured by the velocity measurement means, and for evaluating the calculated flowrate using said comparison, and then for making a selection of one of said calculated flowrate and an alternate flowrate determination based on measured velocity;

means for implementing said selection to produce a signal corresponding to determined flowrate.

2. A flowmeter in accordance with claim 1 in which the depth measurement means is ultrasonic in nature.

3. A flowmeter in accordance with claim 1 in which the velocity measurement means is ultrasonic in nature.

4. A flowmeter in accordance with claim 2 in which the velocity measurement means is ultrasonic in nature.

5. A flowmeter in accordance with claim 1 in which the depth measurement means and velocity measurement means are physically integrated with the computer means.

6. A flowmeter in accordance with claim 4 in which the depth measurement means and velocity measurement means are functionally integrated with the computer means.

7. A method for measurement of liquid flowrate in a channel or other conduit, comprising: measuring liquid depth, measuring high velocity, calculating flowrate based on depth, with a computer, calculating with the computer a flow velocity based on the calculated flowrate, depth, and channel characteristics, comparing with the computer the calculated flow velocity with measured flow velocity, selecting and outputting the calculated flowrate if the comparison is within preselected limits, as determined by the computer, and if the comparison is not within the preselected limits, calculating and outputting an alternate flowrate based on measured velocity.

8. A method for measurement of liquid flowrate in a channel or other conduit of known channel geometry, comprising:

measuring liquid depth in the channel with automatic monitoring equipment;

measuring liquid velocity in the channel with automatic monitoring equipment;

calculating with a computer, at selected intervals, a flowrate based on depth in the channel;

calculating with the computer a cross-sectional area of flow in the channel, based on measured depth and the known channel geometry;

calculating with the computer an average flow velocity, including dividing the calculated flowrate by the calculated cross-sectional area of flow;

comparing with the computer the calculated average flow velocity with the measured flow velocity;

selecting and outputting the calculated flowrate if the comparison is within preselected limits, as determined by the computer; and if the comparison is not within the preselected limits, calculating with the computer a velocity-area flowrate by multiplying calculated cross-sectional area by measured velocity, and outputting the velocity-area flowrate.

9. The method of claim 8, wherein the step of calculating an average flow velocity further includes modifying the calculation based on anticipated velocity profiles and other characteristics for the specific channel geometry.

* * * * *

UNITED STATES PATENT AND TRADEMARK OFFICE
CERTIFICATE OF CORRECTION

PATENT NO. : 4,480,466
DATED : November 6, 1984
INVENTOR(S) : Wendall C. Gates

It is certified that error appears in the above-identified patent and that said Letters Patent are hereby corrected as shown below:

```
Column 1, line 44, after "such as", insert --a--
Column 3, line 20, "than" should read --then--
Column 3, line 26, "than" should read --then--
Column 4, line 29, "high" should read --liquid--
```

Signed and Sealed this

Fourth Day of June 1985

[SEAL]

Attest:

DONALD J. QUIGG

Attesting Officer    Acting Commissioner of Patents and Trademarks